US011179949B2

(12) United States Patent
Nagashima et al.

(10) Patent No.: US 11,179,949 B2
(45) Date of Patent: Nov. 23, 2021

(54) PRINTING DEVICE INCLUDING GUIDE MEMBER GUIDING CONVEYANCE OF LINER-LESS LABEL

(71) Applicant: BROTHER KOGYO KABUSHIKI KAISHA, Nagoya (JP)

(72) Inventors: Yuki Nagashima, Toyokawa (JP); Takehiko Inaba, Aichi-ken (JP); Sho Asai, Ama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/687,286

(22) Filed: Nov. 18, 2019

(65) Prior Publication Data

US 2020/0171845 A1 Jun. 4, 2020

(30) Foreign Application Priority Data

Nov. 30, 2018 (JP) ............................ JP2018-225737

(51) Int. Cl.

| | |
|---|---|
| ***G01D 15/10*** | (2006.01) |
| ***B41J 3/407*** | (2006.01) |
| ***B41J 2/32*** | (2006.01) |
| ***B65C 9/20*** | (2006.01) |
| ***B41J 11/04*** | (2006.01) |

(52) U.S. Cl.

CPC ............... *B41J 3/4075* (2013.01); *B41J 2/32* (2013.01); *B41J 11/04* (2013.01); *B65C 9/20* (2013.01)

(58) Field of Classification Search

None

See application file for complete search history.

(56) References Cited

U.S. PATENT DOCUMENTS

| | | | | |
|---|---|---|---|---|
| 5,642,666 A * | 7/1997 | Petteruti | B65C 11/0226 | 101/288 |
| 2007/0240828 A1* | 10/2007 | Ito | B65C 9/1823 | 156/568 |
| 2011/0220291 A1* | 9/2011 | Roth | B41J 3/4075 | 156/387 |
| 2018/0029389 A1* | 2/2018 | Ando | B41J 11/04 | |

FOREIGN PATENT DOCUMENTS

| | | |
|---|---|---|
| JP | 2000-53315 A | 2/2000 |
| JP | 2000053315 A * | 2/2000 |

* cited by examiner

*Primary Examiner* — Erica S Lin

*Assistant Examiner* — Tracey M McMillion

(74) *Attorney, Agent, or Firm* — Kenealy Vaidya LLP

(57) ABSTRACT

A printing device includes a platen roller, a guide, and an adhesion reduction portion. The platen roller is positioned to contact with a liner-less label. The guide is positioned adjacent to the platen roller and the conveying passage of the liner-less label and downstream of the printing position in a conveying direction of the liner-less label. The guide is configured to guide the liner-less label. The guide has a first area and a second area. The first area is closer to the conveying passage than the second area is to the conveying passage. The second area is closer to the platen roller than the first area is to the platen roller. The adhesion reduction portion is provided at the first area and the second area. The adhesion reduction portion is configured to reduce adhesion of gluing agent to the first area and the second area.

9 Claims, 7 Drawing Sheets

PRINTING DEVICE INCLUDING GUIDE MEMBER GUIDING CONVEYANCE OF LINER-LESS LABEL

CROSS REFERENCE TO RELATED APPLICATION

This application claims priority from Japanese Patent Application No. 2018-225737 filed Nov. 30, 2018. The entire content of the priority application is incorporated herein by reference.

TECHNICAL FIELD

The present disclosure relates to a printing device.

BACKGROUND

There has been conventionally known a mechanism for preventing a gluing surface of a liner-less label from sticking on a printing device during printing on the liner-less label. Japanese Patent Application Publication No. 2000-53315 discloses a label printer capable of performing printing on various types of printing medium including not only liner-base labels but also liner-less labels. The label printer includes a label peeling member at a position downstream of a platen roller in a conveying direction of the printing medium. The label peeling member has a surface facing a conveying path of the printing medium, and the surface is formed with a coating film for preventing the gluing surface of the liner-less label from sticking to the surface.

When performing printing to the liner-base label, the label peeling member contacts the liner-base label to peel off the base liner from the label. On the other hand, when performing printing to the liner-less label, sticking of the gluing surface of the liner-less label to the label peeler is prevented by the coating film.

SUMMARY

However, the liner-less label may possibly enter a space between the platen roller and the label peeling member due to sticking of the gluing surface of the liner-less label to the platen roller. In this case, the gluing surface of the liner-less label may be stuck to the surface of the label peeling member. Hence, conveyance of the printing medium by the platen roller may be inhibited.

In view of the foregoing, it is an object of the disclosure to provide a printing device capable of reducing possibility of adhesion of gluing agent of the liner-less label to a guide member such as a label peeling member even if the liner-less label enters the space between the guide member and the platen roller.

In order to attain the above and other objects, according to one aspect, the disclosure provides a printing device configured to perform printing on a liner-less label having a gluing surface. The printing device includes a platen roller, a guide, and an adhesion reduction portion. The platen roller is positioned to contact, at a predetermined printing position, with a liner-less label conveyed along a conveying passage. The guide is positioned adjacent to the platen roller and the conveying passage and downstream of the printing position in a conveying direction of the liner-less label. The guide is configured to guide the liner-less label in the conveying direction. The guide has a first area closer to the conveying passage than to the platen roller and a second area different from the first area and closer to the platen roller than to the conveying passage. The adhesion reduction portion is provided at each of the first area and the second area of the guide. The adhesion reduction portion is configured to reduce adhesion of gluing agent of the gluing surface to the first area and the second area.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

[Outline of Printing Device 1]

A printing device 1 according to one embodiment will be described with reference to FIGS. 1 through 5. The printing device 1 is connectable to an external terminal (not illustrated) through a USB cable. The printing device 1 is configured to print characters such as alphabets and figures on a printing medium on a basis of print data received from the external terminal. As a printing medium, a heat sensitive label (hereinafter simply referred to as "liner-less label") is used. The liner-less label has no base sheet. The liner-less label has a pair of opposite surfaces. Gluing agent is adhered to one of the surfaces, and printing is performed on the other surface. The one surface to which the gluing agent is adhered will be referred to as "gluing surface".

A personal computer (PC) is one example of the external terminal. The printing device 1 can be battery powered. The printing device 1 can be of a portable type, such that the printing device 1 is attached to a waist belt of a user through a belt clip (not illustrated). Directions indicated by arrows in FIG. 1 will be referred to as "leftward", "rightward", "frontward", "rearward", "upward", and "downward", and these directions will be applied to all drawings.

[Casing 10]

Figure 1:
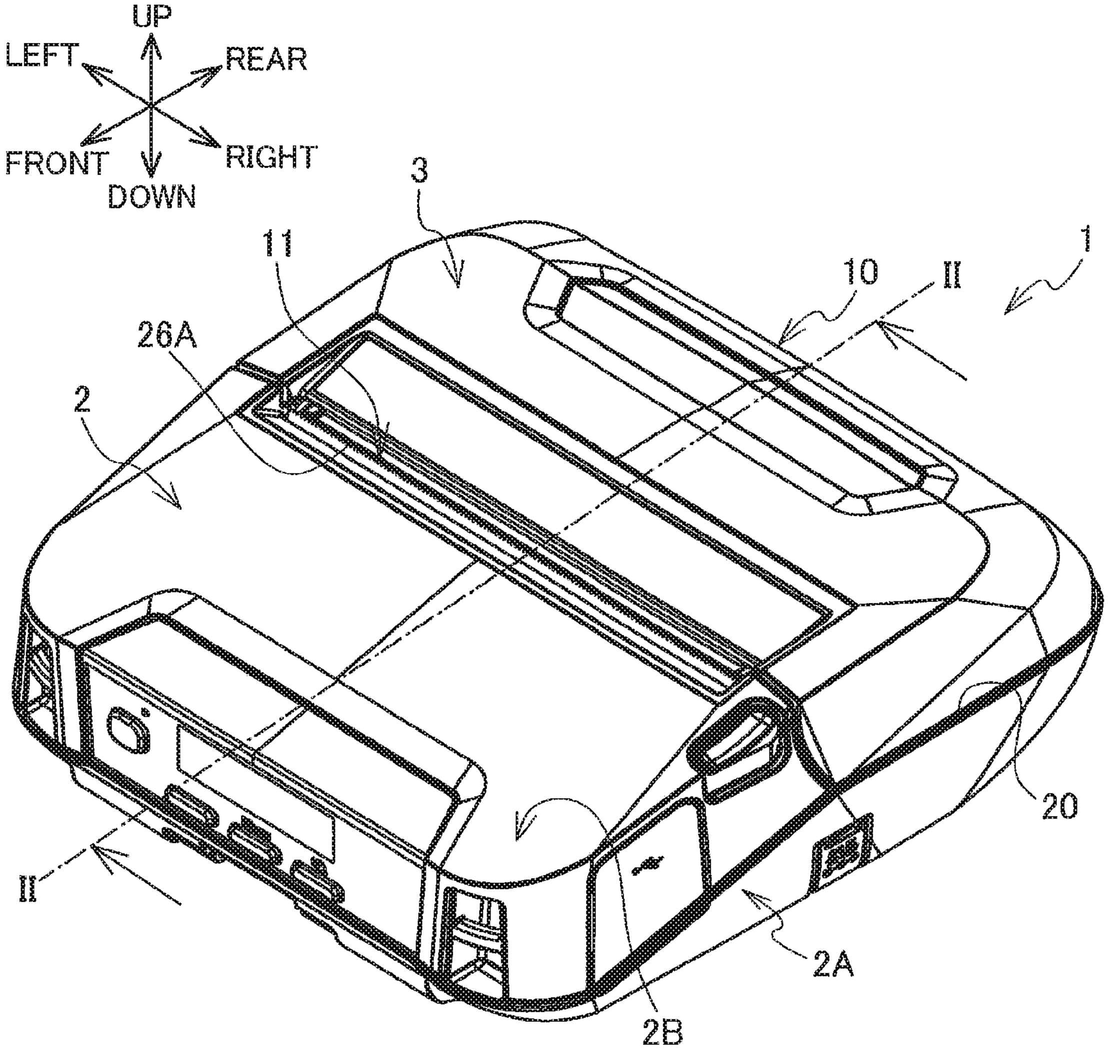
FIG. 1 is a perspective view of a printing device according to one embodiment.

As illustrated in FIG. 1, the printing device 1 includes a casing 10 having a box shape. The casing 10 includes a main body portion 2 and a cover 3. The main body portion 2 has a generally rectangular parallelepiped box shape. The main body portion 2 includes a bottom portion 2A and a front cover portion 2B. The bottom portion 2A covers internal space of the printing device 1 from below. The front cover portion 2B covers generally front half part of the internal space of the printing device 1 from above.

Figure 2:
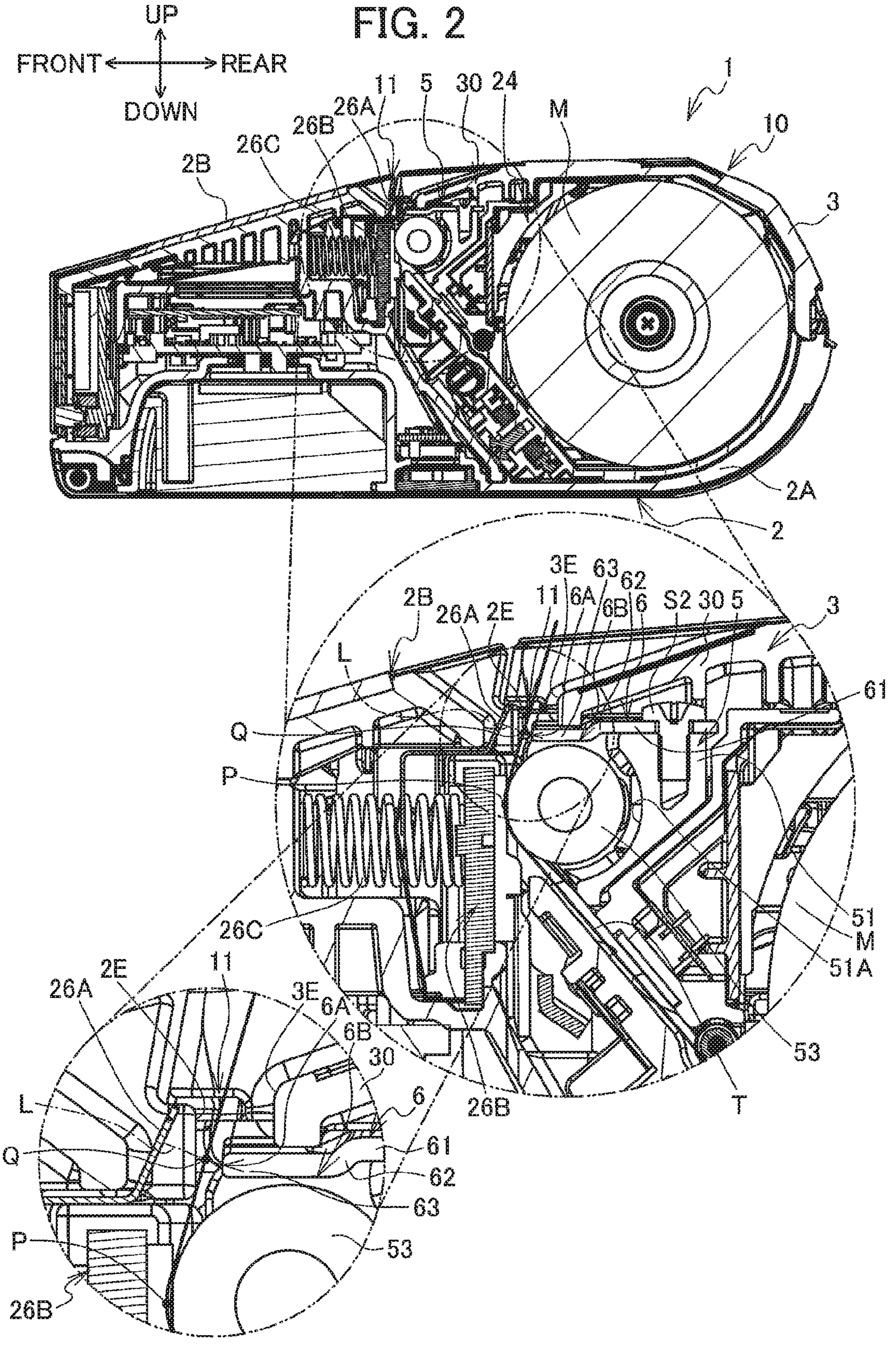
FIG. 2 is a cross-sectional view of the printing device taken along a line II-II of FIG. 1.

As illustrated in FIG. 2, an accommodating portion 24 is provided at a generally rear half portion of the bottom portion 2A for accommodating a sheet roll M. The sheet roll M is constituted by winding the liner-less label onto a hollow cylindrical core. The gluing surface of the liner-less label is positioned radially inward of the rolled sheet.

As illustrated in FIG. 1, the main body portion 2 has an opening portion 20 which is surrounded by an upper end of the generally rear half portion of the bottom portion 2A and a rear end of the front cover portion 2B. The opening portion 20 can be opened and closed by the cover 3. An upper portion of the accommodating portion defined above the opening portion 20 is exposed outside when the cover 3 is opened. That is, the accommodating portion 24 is opened upward.

A cutter blade 26A is provided in the main body portion 2 at a position near a front end portion of the opening portion 20. The cutter blade 26A is configured to cut and separate a portion of the liner-less label that has been printed and ejected through an ejection opening 11 (described later) from a remaining part of the liner-less label.

As illustrated in FIG. 2, a thermal head 26B is positioned below the cutter blade 26A. The thermal head 26B is configured to heat the liner-less label to print characters on the liner-less label. The cutter blade 26A and the thermal head 26B extend in the leftward/rightward direction.

A spring 26C is positioned frontward of the thermal head 26B. The spring 26C has a rear end portion seated on a front surface of the thermal head 26B, and has a front end portion held by an inner portion of the front cover 2B of the main body portion 2. Hence, the thermal head 26B is biased rearward by the resiliency of the spring 26C.

As illustrated in FIG. 1, the cover 3 is pivotally movably supported by the rear end portion of the bottom portion 2A of the main body portion 2. The cover 3 is pivotally movable about the rear end portion of the bottom portion 2A of the main body portion 2 between a closed position and an open position. In the closed position, the accommodating portion 24 (FIG. 2) is covered by the cover 3 from above. In the open position, the accommodating portion 24 is open to an outside. FIG. 1 illustrates the closed position of the cover 3. In the following description, direction of the cover 3 will be based on the closed position of the cover 3.

As illustrated in FIG. 2, the front cover portion 2B has a rear end 2E, and the cover 3 has a front end 3E. The above-described ejection opening 11 is defined between the rear end 2E and the front end 3E. As illustrated in FIG. 1, the ejection opening 11 extends in the leftward/rightward direction. The ejection opening 11 allows the portion of the liner-less label that has been printed by the thermal head 26B inside the casing 10 to be discharged outside through the ejection opening 11.

As illustrated in FIG. 2, a platen holder 30 is provided at a lower surface of the cover 3 at a position near the front end 3E of the cover 3. The platen holder 30 detachably supports a platen unit 5 (FIG. 3) described later.

[Platen Unit 5]

Figure 3:
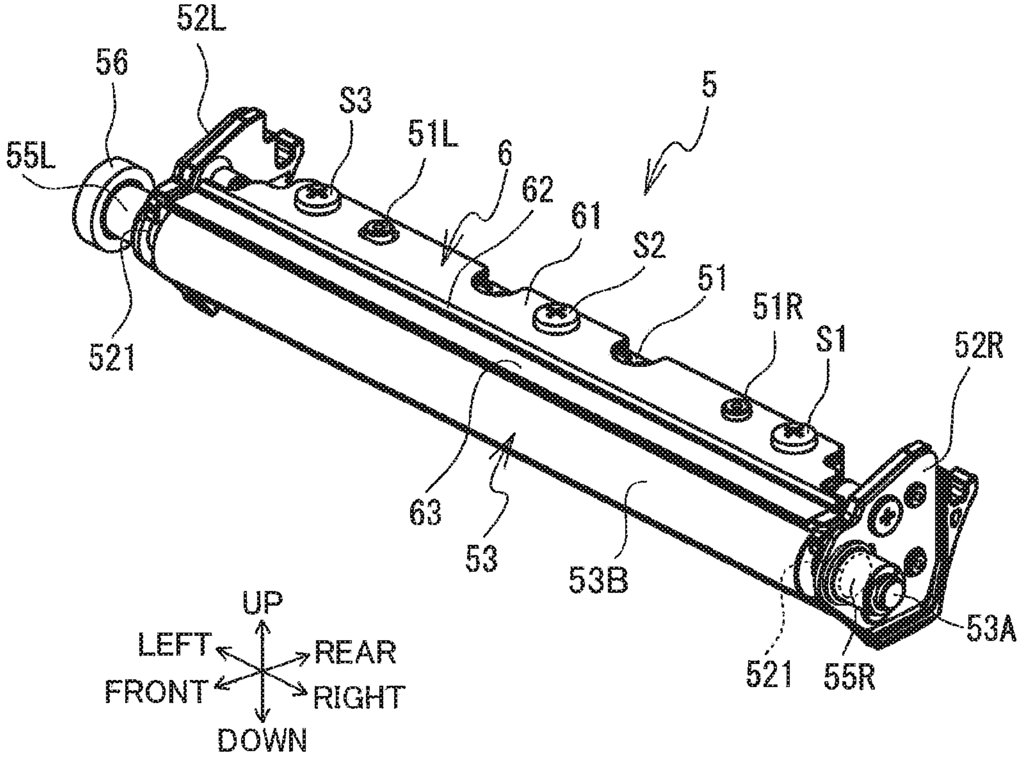
FIG. 3 is a perspective view of a platen unit in the printing device according to the embodiment.

As illustrated in FIG. 3, the platen unit 5 includes a bridge portion 51, wall portions 52R, 52L, a platen roller 53, bearings 55R, 55L, a platen gear 56, and a guide member 6. The bridge portion 51 extends in the leftward/rightward direction. The bridge portion 51 has an upper surface to which the guide member 6 is fixed. The bridge portion 51 is formed with a recess 51A (FIG. 2) recessed rearward in an arcuate shape. Protruding portions 51R, 51L protrude upward from the upper surface of the bridge portion 51. The protruding portions 51R, 51L are generally column shape and are spaced away from each other in the leftward/rightward direction.

The wall portion 52R is connected to a right end of the bridge portion 51. The wall portion 52L is connected to a left end of the bridge portion 51. The wall portions 52R, 52L are generally plate shaped and extend both in the front/rear direction and the upper/lower direction. That is, the wall portions 52R, 52L extend perpendicularly to the leftward/rightward direction. Each of the wall portions 52R, 52L has a front end portion formed with a through-hole 521 extending throughout a thickness of the each wall portion.

The platen roller 53 has a column shape and extends in the leftward/rightward direction. The platen roller 53 is positioned frontward of the recess 51A (FIG. 2) of the bridge portion 51. The platen roller 53 includes a rotation shaft 53A and a roller body 53B. The roller body 53B has a length in the leftward/rightward direction slightly smaller than a distance between the wall portions 52R and the 52L.

The rotation shaft 53A extends outward from each end in the leftward/rightward direction of the roller body 53B. The rotation shaft 53A has a column shape and extends in the leftward/rightward direction. The rotation shaft 53A extends through the through-holes 521 of the wall portions 52R, 52L and protrudes outward from each wall portion. The rotation shaft 53A is rotatably supported by the wall portions 52R, 52L. The rotation shaft 53A has a diameter smaller than an inner diameter of the through-holes 521.

Each of the bearings 55R, 55L is a sleeve like member having through-holes through which the rotation shaft 53A extends. Each of the bearings 55R, 55L has an outer diameter greater than the inner diameter of each of the through-holes 521 of the wall portions 52R, 52L.

The right end portion of the rotation shaft 53 extends through the through-hole 521 of the wall portion 52R and protrudes rightward from the wall portion 52R. The bearing 55R is provided to a portion of the right end portion of the rotation shaft 53 that protrudes rightward from the wall portion 52R. Thus, the bearing 55R is positioned rightward of the wall portion 52R.

The left end portion of the rotation shaft 53 extends through the through-hole 521 of the wall portion 52L and protrudes leftward from the wall portion 52L. The bearing 55L is provided to a portion of the left end portion of the rotation shaft 53 that protrudes leftward from the wall portion 52L. Thus, the bearing 55L is positioned leftward of the wall portion 52L. The bearings 55R, 55L prevent the rotation shaft 53A from releasing from the wall portions 52R, 52L. The platen gear 56 is attached to the left end portion of the bearing 55L.

The platen roller 53 is rotatably supported by the wall portions 52R, 52L through the rotation shaft 53A. Further, a gap is provided between the rotation shaft 53A and the inner surface of each through-hole 521 of each wall portion 52R, 52L. Hence, the platen roller 53 is slightly movable in a direction perpendicular to the extending direction of the rotation shaft 53A, i.e., in a direction perpendicular to the leftward/rightward direction in accordance with the movement of the rotation shaft 53A inside the through-holes 521 of the wall portions 52R, 52L.

[Guide Member 6]

Figure 4:
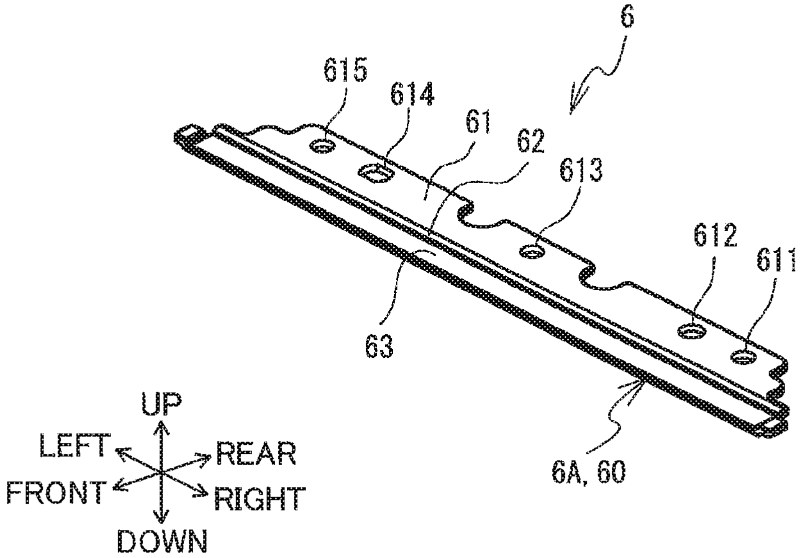
FIG. 4 is a perspective view of a guide member in the printing device according to the embodiment, the guide member being viewed from above.
Figure 5:
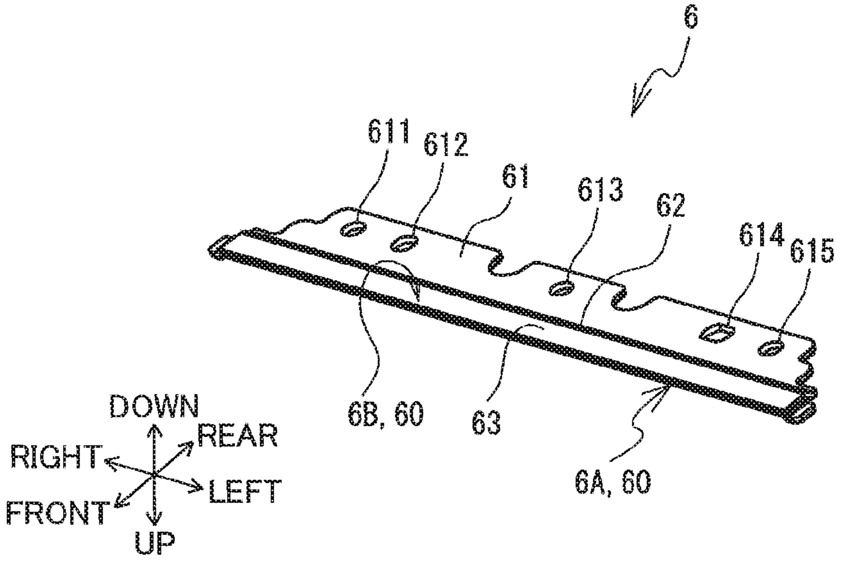
FIG. 5 is a perspective view of the guide member in the printing device according to the embodiment, the guide member being viewed from below.

The guide member 6 is an example of "a guide". The guide member 6 is generally rectangular plate shaped, and extends in the leftward/rightward direction. As illustrated in FIGS. 4 and 5, the guide member 6 includes a first plate section 61, a second plate section 62 and a third plate section 63. The first plate section 61 and the third plate section 63 are generally rectangular in shape elongated in the leftward/rightward direction and are oriented perpendicularly to the upward/downward direction. The second plate section 62 connects a front end of the first plate section 61 to a rear end of the third plate section 63. The third plate section 63 is positioned slightly lower than the first plate section 61 (see FIG. 2). The second plate section 62 is sloped diagonally downward in the frontward direction in a side view (see FIG. 2).

The first plate section 61 is formed with through-holes 611, 612, 613, 614, 615 arrayed in this order in-line in the leftward direction. The through-hole 613 is positioned at a center of the first plate section 61 in the leftward/rightward direction. As illustrated in FIG. 4, the third plate section 63 has a front edge. The surface of the front edge (a front end face) will be referred to as a first surface 6A. As illustrated in FIG. 5, the third plate section 63 further has a lower surface (a lower end face) which will be referred to as a second surface 6B. An adhesion reduction portion 60 is provided at each of the first surface 6A and the second surface 6B. More specifically, the adhesion reduction portion 60 is provided over an entire part of each of the first surface 6A and second surface 6B.

The adhesion reduction portion 60 is an embossed pattern formed on each of the first and second surfaces 6A and 6B. The embossed pattern is formed over the entire area of each of the first and second surfaces 6A and 6B. The embossed pattern is a minute surface texturing constituted from minute irregularities formed on each of the first surface 6A and the second surface 6B. In a case where the guide member 6 is made from a resin, a metal mold for molding the guide member 6 may be subjected to emboss processing, so that the emboss pattern of the metal mold is transferred to the guide member 6. In a case where the guide member 6 is made from metal, the embossed pattern may be formed on the surface of the guide member 6 by chemical etching or sand blasting.

Contacting areas of the first and second surfaces 6A, 6B with respect to the gluing surface of the liner-less label can be reduced because of the emboss pattern. Hence, the embossed patterns on the first and second surfaces 6A, 6B can restrain the gluing agent of the liner-less label from adhering to the first and second surfaces 6A, 6B. Incidentally, coarse and deep embossed pattern is preferable in order to effectively reduce adhesion of the gluing agent.

As illustrated in FIGS. 3 through 5, the protrusions 51R, 51L of the bridge portion 51 are inserted in the through-holes 612, 614 (see FIGS. 4 and 5) from below. The lower surface of the first plate section 61 contacts an upper surface of the bridge portion 51 from above. Male threads S1, S2, S3 are inserted through the through-holes 611, 613, and 615 are threadingly engaged with the bridge portion 51. Hence, the guide member 6 is fixed to the bridge portion 51. The third plate section 63 of the guide member 6 is positioned adjacent to an upper surface of the platen roller 53 (see FIG. 2). The third plate section 63 and the platen roller 53 are separate from each other in the upward/downward direction with a minute gap therebetween. The second surface 6B of the third plate section 63 faces the platen roller 53 from above.

[Positional Relationship Among Platen Roller 53, Guide Member 6, and Conveying Passage T]

As illustrated in FIG. 2, in the state where the platen unit 5 is supported by the platen holder 30 of the cover 3, the platen roller 53 supported by the platen unit 5 is in contact with the thermal head 26B from behind. A contacting position between the platen roller 53 and the thermal head 26B will be referred to as "printing position P". In the printing position P, an image is formed on the liner-less label upon heat generation of the thermal head 26B in a state where the liner-less label is nipped between the platen roller 53 and the thermal head 26B.

The liner-less label is pulled out from approximately the lower end portion of the roll M accommodated in the accommodation portion 24. A conveying passage T of the liner-less label extends diagonally upward and frontward from the lower end portion of the roll M, and is bent upward at a position adjacent to a rear end of the thermal head 26B, and extends upward through the printing position P. The platen roller 53 is in contact with the liner-less label conveyed along the conveying passage T at the printing position P. The conveying passage T is then slightly bent rearward passing by a front end of the guide member 6 and extends diagonally upward and rearward toward the ejection opening 11. A direction along the conveying passage T will be referred to as "conveying direction". The gluing surface of the liner-less label faces rearward when the liner-less label is conveyed along the conveying passage T.

The guide member 6 is positioned downstream of the printing position P in the conveying direction. The first surface 6A of the third plate section 63 of the guide member 6 is disposed apart from the conveying passage T in the rearward direction and faces the conveying passage T. It is noted that the first surface 6A and the second surface 6B of the third plate section 63 can be defined also as a first area and a second area, respectively, of the third plate section 63 such that the first area is closer to the conveying passage T than the second area is to the conveying passage T and the second area is closer to the platen roller 53 than the first area is to the platen roller 53. The guide member 6 is configured to guide the liner-less label so that part of the liner-less label positioned downstream of the printing position P can be suitably directed toward the ejection opening 11.

Specifically, the liner-less label may be bent or deviated rearward from the conveying passage T at a position downstream of the printing position P in the conveying direction due to adhesion of the gluing agent to the platen roller 53. In such a case, the guide member 6 prevents the liner-less label from entering into a gap between the cover 3 of the casing 10 and the platen roller 53 by making the first end surface 6A contact the liner-less label. Hence, the platen unit 5 can lead the liner-less label toward the ejection opening 11.

When viewing the ejection opening 11 from above, a part of the third plate section 63 of the guide member 6 is exposed to an outside of the printing device 1 through the ejection opening 11. That is, an opening area of the ejection opening 11 is partly closed by the third plate section 63.

The conveying passage T has a portion nearest to the guide member 6. The position of the nearest portion will be referred to as "proximity portion Q" (see FIG. 2). As shown in a partially enlarged view in the vicinity of the first surface 6A in FIG. 2, the proximity portion Q is defined at an intersection between the conveying passage T and an imaginary line L, which passes through the first surface 6A of the third plate section 63 and extends in a direction perpendicular to the conveying passage T. The liner-less label is conveyed in a direction diagonally upward and rearward at the proximity portion Q. It is noted that an imaginary orientation plane is defined for the guide member 6 as indicative of an orientation of the guide member 6. More specifically, the imaginary orientation plane is defined such that the first plate section 61 and the third plate section 63 of the guide member 6 extend parallel to the imaginary orientation plane of the guide member 6. In this embodiment, the imaginary orientation plane of the guide member 6 is parallel to the horizontal plane. Hence, the conveying direction of the liner-less label at the proximity portion Q crosses or intersects the imaginary orientation plane for the guide member 6.

[Outline of Printing Operation]

The cover 3 of the printing device 1 is opened, and the liner-less label is pulled out from the roll M. The cover 3 is moved from the open position to the closed position in a state where part of the liner-less label pulled out from the roll M is positioned at the conveying passage T. The liner-less label is nipped between the thermal head 26B and the platen roller 53 in the frontward/rearward direction at the printing position P.

The platen gear 56 of the platen unit 5 is in meshing engagement with a main gear (not illustrated) provided at the bottom portion 2A of the casing 10. A motor (not illustrated) connected to the main gear is actuated. Rotational driving force of the motor is transmitted to the platen roller 53 through the main gear and the platen gear 56 to rotate the platen roller 53. Rotation of the platen roller 53 conveys the liner-less label nipped between the platen roller 53 and the thermal head 26B downstream in the conveying direction. Simultaneously, the thermal head 26B is heated. Hence, printing is performed on the liner-less label while the liner-less label is pulled out from the roll M. The liner-less label that has been printed is discharged from the ejection opening 11.

[Function and Effect in the Embodiment]

There is a probability that gluing agent of the liner-less label may be adhered to the platen roller 53, as a result of which the liner-less label may be curved rearward to be displaced from the conveying passage T at a position downstream of the printing position P in the conveying direction. Especially when adhesion of the liner-less label to the platen roller 53 is excessive, the guide member 6 may fail to guide the liner-less label to the ejection opening 11, but the liner-less label may enter into the gap between the guide member 6 and the platen roller 53. In such cases, the gluing surface of the liner-less label becomes adhered to the second surface 6B of the guide member 6. Such triggers the jamming of the liner-less label.

Incidentally, entry of the liner-less label into the gap between the platen roller 53 and the guide member 6 may be restrained by reducing the distance between the platen roller 53 and the platen unit 5. However, as described above, the platen roller 53 is arranged so as to be slightly movable in the direction perpendicular to the extending direction (leftward/rightward direction) of the rotation shaft 53A. Accordingly, there is a limit to reduction in the distance between the platen roller 53 and the platen unit 5. Reduction in the distance may not be attainable sufficiently.

For dealing with the jamming of the liner-less label, for example, a user dismounts the platen unit 5 from the platen holder 30, and peels off the liner-less label from the guide member 6. Thereafter, the user attaches the platen unit 5 to the platen holder 30 to restore an original structure permitting the printing device 1 to be printable condition.

Here, if the gluing agent of the liner-less label remains on the second surface 6B of the guide member 6, jamming of the liner-less label is likely to occur again. In this connection, residual gluing agent should not remain on the second surface 6B of the guide member 6. According to the present embodiment, the adhesion reduction portion 60 which can reduce adhesion of the gluing agent of the liner-less label is provided not only at the first surface 6A facing the conveying passage (facing the gluing surface of the liner-less label) but also at the second surface 6B facing the platen roller 53.

Hence, even if the liner-less label enters into the gap between the platen roller 53 and the guide member 6, adhesion of the gluing agent to the second surface 6B of the guide member 6 can be restrained. Accordingly, even if jamming of the liner-less label occurs, probability that the gluing agent remains on the second surface 6B of the guide member 6 can be reduced. Consequently, the printing device 1 can continue to perform printing operation even after occurrence of liner-less label jamming.

The guide member 6 is flat plate shaped, and is oriented such that the third plate section 63 extends perpendicularly to the upward/downward direction. The conveying direction of the liner-less label at the proximity portion Q of the conveying passage T is diagonally upward and rearward, and crosses the imaginary orientation plane for the guide member 6. With such a geometrical relationship, an area of the first surface 6A that faces the conveying passage T can be reduced. Hence, in the printing device 1, probability of adhesion of the gluing agent of the liner-less label to the first surface 6A can be reduced.

The adhesion reduction portion 60 formed at each of the first surface 6A and the second surface 6B is the embossed pattern containing minute surface irregularities formed on the each of the first and second surfaces 6A, 6B. Hence, the structure for reducing adhesion of the gluing agent of the liner-less label to an opponent surface of the liner-less label can be easily formed on the first surface 6A and the second surface 6B of the guide member 6.

The printing device 1 has the ejection opening 11 through which the liner-less label is ejected. The guide member 6 closes a part of the ejection opening 11. With this structure, the guide member 6 can restrain the gluing agent from contacting with the ejection opening 11, thereby restraining adhesion of gluing agent to the ejection opening 11.

[Modification]

Figure 6:
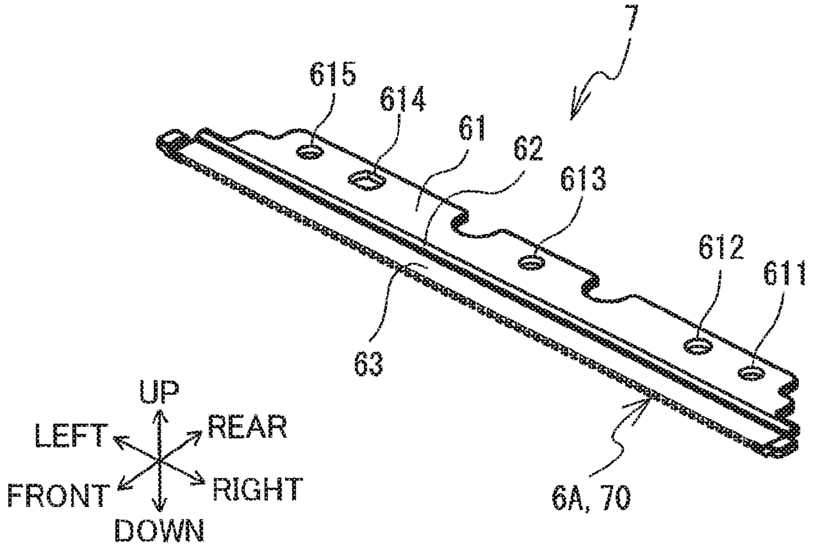
FIG. 6 is a perspective view of a guide member in a printing device according to a modification, the guide member being viewed from above.
Figure 7:
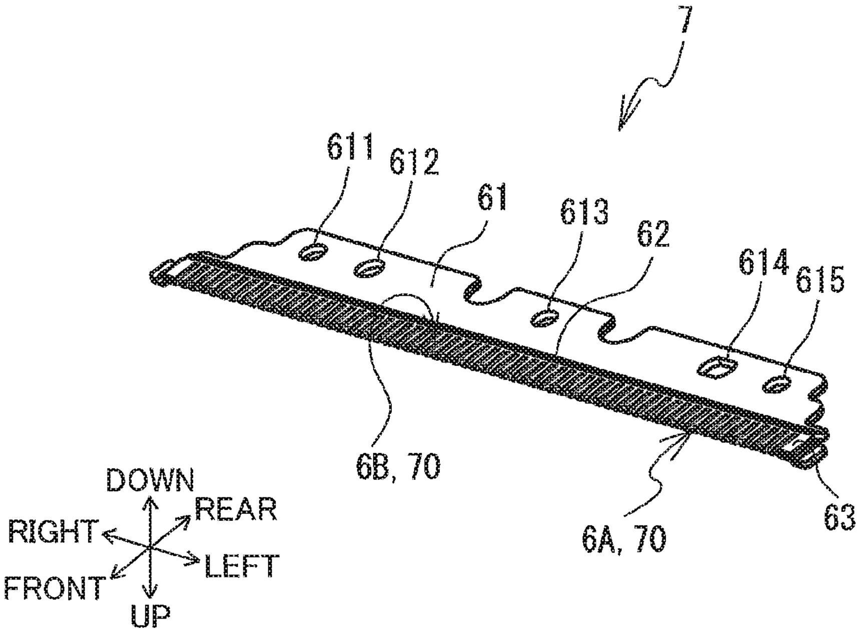
FIG. 7 is a perspective view of the guide member in the printing device according to the modification, the guide member being viewed from below.

Various modifications are conceivable. A printing device according to one modification will be described with reference to FIGS. 6 and 7, which pertains to modification to the guide member. According to the modification, instead of the guide member 6 of the above-described embodiment, a guide member 7 is fixed to the platen unit 5. In the guide member 7, an adhesion reduction potion 70 is provided instead of the adhesion reduction portion 60. Remaining structure of the guide member 7 is the same as that of the guide member 6 of the above-described embodiment. In FIGS. 6 and 7, like parts and components are designated by the same reference numerals as those shown in FIGS. 4 and 5 to avoid duplicating description.

As illustrated in FIGS. 6 and 7, the adhesion reduction potion 70 is provided at each of the first surface 6A and the second surface 6B of the guide member 7. More Specifically, the adhesion reduction portion 70 is provided over the entire part of each of the first and second surfaces 6A and 6B. The adhesion reduction potion 70 of each of the first surface 6A and the second surface 6B is constituted by minute ribs protruding from the each of the first surface 6A and the second surface 6B. The ribs are formed on the entire area of each of the first surface 6A and the second surface 6B. Specifically, at both of the first surface 6A and the second surface 6B, the ribs are arrayed in the leftward/rightward direction. At the first surface 6A, each rib extends in the upward/downward direction. At the second surface 6B, each rib extends in the frontward/rearward direction.

In a case where the guide member 7 is made from resin, the ribs may be molded integrally with the guide member 7. Contacting area of the guide member 7 with the gluing agent can be reduced by the ribs. Hence, the ribs can reduce adhesion of the gluing agent of the liner-less label to the first and second surfaces 6A, 6B of the guide member 7. In this way, the guide member 7 can easily provide a structure capable of reducing adhesion of the gluing agent to the first and second surfaces 6A, 6B.

[Other Modifications]

The shape of the guide member 6 may be modified to a flat plate shape without the second plate section 62. That is, the first plate section 61 and the third plate section 63 are flush with each other forming a flat plate shape. Further, the guide member 6 may be inclined with respect to the horizontal plane perpendicular to the upward/downward direction. In this case, the guide member may be inclined diagonally downward and frontward.

Further, in the above-described embodiment, the guide member 6 is disposed apart from the conveying passage T rearwardly. However, the guide member 6 may be positioned such that the first surface 6A of the guide member 6 is in contact with the conveying passage T. That is, the first surface 6A may contact the liner-label conveyed along the conveying passage T. Further, an extension portion extending upward or downward from the front edge of the guide member 6 may be provided. In this case, an entire front surface of the extension portion corresponds to the first surface 6A. Further, an entire surface of the guide member 6 including the first surface 6A and the second surface 6B may be provided with the adhesion reduction portion 60 (emboss pattern) or the adhesion reduction potion 70 (ribs).

Further, conveying direction of the liner-less label at the proximity position Q may be upward direction. In this case, the imaginary orientation plane for the guide portion 6 is perpendicular to the conveying direction at the proximity portion Q. Especially, in the case where the above-described extension portion is provided, the extension portion may be parallel to the conveying direction at the proximity position Q.

Further, the emboss pattern formed at each of the first and second surfaces 6A, 6B functioning as the adhesion reduction portion 60 may be formed by a method other than the above-described methods.

Further, the above-described minute surface irregularities formed at each of the first and second surfaces 6A, 6B are not limited to the emboss patterns and ribs described above, but other various surface irregularities are available.

Further, instead of providing the above described adhesion reduction portion 60 (emboss processing) or the adhesion reduction portion 70 (ribs), at least the first and second surfaces 6A, 6B of the guide member 6 may be subjected to surface treatment such that the first surface 6A and the second surface 6B are covered by material that can reduce adhesion of the gluing agent thereto. Specifically, silicone resin coating or fluorocarbon resin coating may be effected to the entire area of each of the first and second surfaces 6A, 6B. In this case, the guide member 6 has the same configuration as that shown in FIGS. 4 and 5 except that the surfaces 6A and 6B are coated with the surface treatment layer and no emboss pattern is provided on the surfaces 6A and 6B. With this structure, reduction in adhesion of the gluing agent to each of the first and second surfaces 6A, 6B can be easily attained by the simple formation of the surface treatment layer. Further, other surface treatment is also available. Further, in addition to providing the adhesion reduction portion 60 (emboss processing) or the adhesion reduction portion 70 (ribs) to the surfaces 6A and 6B of the guide member 6 and 7, the surface treatment may be carried out to the surfaces 6A and 6B of the guide members 6 and 7.

The third plate section 63 may not partly close the ejection opening 11. For example, the front edge of the third plate section 63 and the front end 3E of the cover 3 may be aligned with each other in the frontward/rearward direction. In the latter case, when viewing the ejection opening from above, no part of the third plate section 63 is exposed to the outside of the printing device 1 through the ejection opening 11, and therefore does not close the ejection opening 11.

While the description has been made in detail with reference to the embodiments thereof, it would be apparent to those skilled in the art that many modifications and variations may be made therein without departing from the spirit of the disclosure.

For example, in the embodiment, the third plate section 63 has a rectangular plate shape. Both of the first surface 6A (surface of the front edge of the third plate section 63) and the second surface 6B (lower surface of the third plate section 63) are planar surfaces. The first surface 6A extends downwardly in a linear manner from an upper-front edge to of the third plate section 63 a lower-front edge of the third plate section 63. At the lower-front edge of the third plate section 63, the first surface 6A is connected to the second surface 6B via a slightly rounded corner. The second surface 6B extends rearwardly in a linear manner from the lower-front edge of the third plate section to a lower-rear edge of the third plate section 63. The first surface 6A faces forwardly, while the second surface 6B faces downwardly.

However, the third plate section 63 may not have a rectangular plate shape. For example, the third plate section 63 may be modified such that the first surface 6A and the second surface 6B are combined together into a single curved surface that extends from the upper-front edge of the third plate section 63 obliquely downward and rearward to the lower-rear edge of the third plate section 63 continuously in a curved fashion. The single curved surface faces both of the conveying passage T and the platen roller 53. A front region and a rear region of the single curved surface are defined such that the front region is frontward of the rear region. The front region of the single curved surface serves as the first area, and the rear region of the single curved surface serves as the second area because the front region is closer to the conveying passage T than the rear region is to the conveying passage T and the rear region is closer to the platen roller 53 than the front region is to the platen roller 53.

What is claimed is:

1. A printing device configured to perform printing on a liner-less label having a gluing surface, the printing device comprising:

a platen roller positioned to contact, at a predetermined printing position, with a liner-less label conveyed along a conveying passage;

a guide positioned adjacent to the platen roller and the conveying passage and downstream of the printing position in a conveying direction of the liner-less label, the guide being configured to guide the liner-less label in the conveying direction, the guide having a first area and a second area different from the first area, the guide including a plate which has an edge portion and a planner surface portion, the plate having the first area at the edge portion and having the second area at the planner surface portion, the first area being closer to the conveying passage than the second area is to the conveying passage, and the second area being closer to the platen roller than the first area is to the platen roller; and an adhesion reduction portion provided at each of the first area and the second area of the guide, the adhesion reduction portion being configured to reduce adhesion of gluing agent of the gluing surface to the first area and the second area.

2. The printing device according to claim 1, wherein the platen roller comprises a rotation shaft;

wherein the conveying passage has a proximity portion positioned closest to the guide;

wherein the guide is plate shaped, and extends parallel to an imaginary plane, an extending direction of the rotation shaft extending parallel to the imaginary plane, the conveying direction at the proximity portion intersecting the imaginary plane.

3. The printing device according to claim 1, wherein the adhesion reduction portion provided at each of the first area and the second area includes an embossed pattern formed on the each of the first area and the second area.

4. The printing device according to claim 1, wherein the adhesion reduction portion provided at each of the first area and the second area includes a plurality of ribs formed on the each of the first area and the second area.

5. The printing device according to claim 1, wherein the adhesion reduction portion provided at each of the first area and the second area includes material that is coated on the each of the first area and the second area so as to reduce adhesion of the gluing agent to the each of the first area and the second area.

6. The printing device according to claim 1, further comprising a casing in which the platen roller and the guide are accommodated, the casing having an ejection opening configured to eject the liner-less label therethrough;

wherein the guide partly closes the ejection opening.

7. The printing device according to claim 1, the adhesion reduction portion is provided over an entire part of each of the first area and the second area.

8. The printing device according to claim 1, wherein the guide has a first surface and a second surface different from the first surface, the first surface facing the conveying passage and being closer to the conveying passage than the second surface is to the conveying passage, the second surface facing the platen roller and being closer to the platen roller than the first surface is to the platen roller, and wherein the first area includes the first surface, and the second area includes the second surface.

9. The printing device configured to perform printing on a liner-less label having a gluing surface, the printing device comprising:

a platen roller positioned to contact, at a predetermined printing position, with a liner-less label conveyed along a conveying passage;

a guide positioned adjacent to the platen roller and the conveying passage and downstream of the printing position in a conveying direction of the liner-less label, the guide being configured to guide the liner-less label in the conveying direction, the guide having a first area and a second area different from the first area, the first area being closer to the conveying passage than the second area is to the conveying passage, and the second area being closer to the platen roller than the first area is to the platen roller; and an adhesion reduction portion provided at each of the first area and the second area of the guide, the adhesion reduction portion being configured to reduce adhesion of gluing agent of the gluing surface to the first area and the second area, wherein the guide includes a plate having an edge portion, wherein the guide has the first area at the edge portion, and wherein the plate comprises:

a first plate section;

a second plate section connected to the first plate section; and a third plate section extending parallel to the first plate section and connected to the second plate section, the third plate section having:

the edge portion, the edge portion facing the conveying passage;

another edge portion opposite to the edge portion in a direction, in which the third plate section extends, the third plate section being connected to the second plate section at the another edge portion; and a planar surface portion positioned between the edge portion and the another edge portion and facing the platen roller, the guide having the first area at the edge portion of the third plate section and having the second area at the planar surface portion of the third plate section.

* * * * *